May 19, 1925.
A. DOWALD
BALL BEARING
Filed Jan. 26, 1924
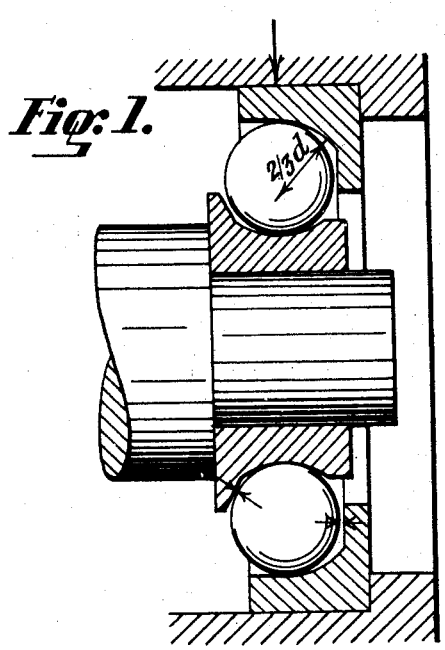
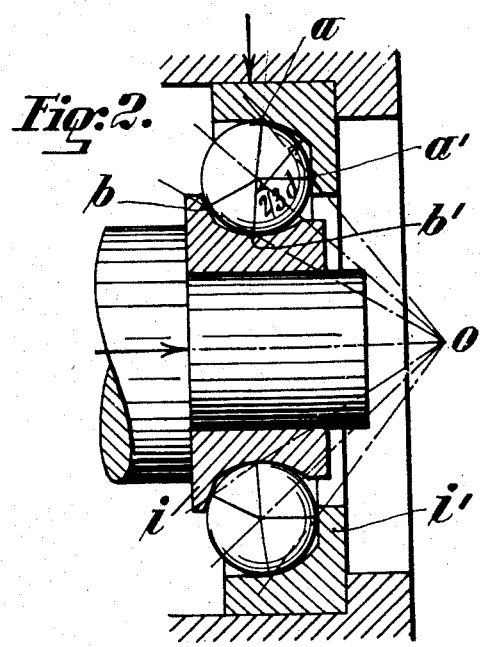
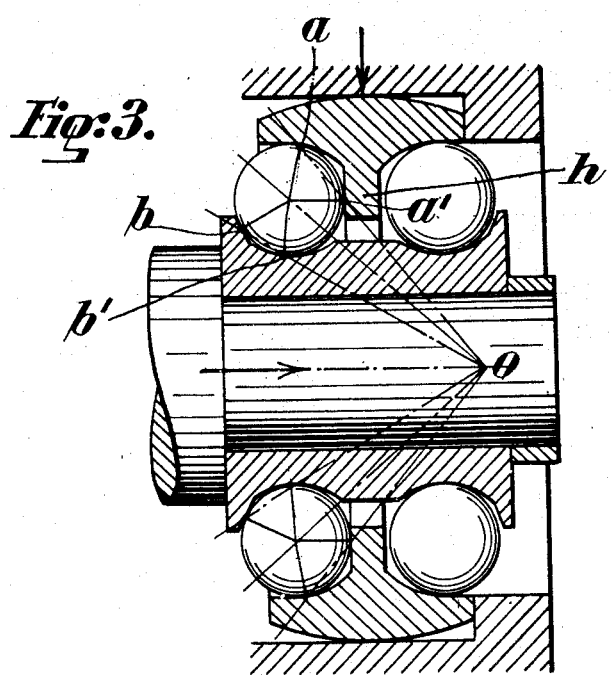
Inventor
A. Dowald
By Markon Clerk
Attys Patented May 19, 1925.

1,538,275

UNITED STATES PATENT OFFICE.

ADOLF DOWALD, OF BREMEN, GERMANY.

BALL BEARING.

Application filed January 26, 1924. Serial No. 688,786.

*To all whom it may concern:*

Be it known that I, ADOLF DOWALD, a citizen of Germany, and residing at 72, Schleifmuhle, Bremen, Germany, have invented certain new and useful Improvements in and Relating to Ball Bearings, of which the following is a specification.

The subject of this invention is a ball bearing, the ball races of which are provided with lateral flanges for taking up the axial thrust.

Ball bearings for radial and axial loading have already been proposed, which are provided with separate flanges for taking up the latter. One of these constructions has two perpendicular flanges besides two normal race grooves, another construction has besides two perpendicular flanges one normal race groove and an inclined outer running surface. The former construction has the disadvantage that the perpendicular flanges are always in contact with the balls and that there is therefore sliding friction. The latter construction, while with simultaneous radial and axial loading it fulfils the condition, that there shall only be rolling friction on the balls, has the disadvantage that, when the loading is radial only, the inclined outer running surface causes a sliding of the balls.

The object of the new arrangement is to obtain a purely rolling motion of the balls with an ordinary radial load or with a simultaneous radial and axial load, and thereby to prevent all friction by giving the flanges a suitable form. The bearing according to the invention takes up the axial thrusts and renders the use of a separate thrust bearing, such as is required with ordinary ball bearings, superfluous. In contradistinction to ball bearings of the usual type, a bearing according to the present invention is capable of taking up besides the full radial load, the equally great axial load. This is effected by the position of the flanges being such with respect to the grooves of the races, which are turned to a radius exceeding that of the balls, that with a simultaneous radial and axial load, the points of contact of the balls with the flanges and the grooves lie on the surfaces of imaginary cones having their apices in one point on the axis of the bearing, while, when the load is only radial, contact is only made at those points of the balls, which lie in the central plane vertical of the bearing.

In the accompanying drawing, ball bearings according to the invention are shown. In said drawing:—

Fig. 1 is an axial section through a single race ball bearing, under radial load only.

Fig. 2 is a similar view with the bearing under both radial and axial load.

Fig. 3 a similar section through a bearing with two races.

Figs. 1 and 2 show the simplest constructional form of the ball bearing with lateral flanges. As the groove is turned to a radius, which is two-thirds of the diameter of the balls, the bearing will run as a radial bearing as in the well-known series bearings, the conditions being favourable.

By the groove being given the dimensions referred to, the balls, when running under radial load only, are always kept with the amount of clearance shown between the lateral flanges and the balls in Fig. 1, into which position they always return, after an axial thrust has ceased.

The well-known series bearings can only take up temporarily an axial thrust amounting to one-third of the radial load, the action being an unfavourable wedge-like one. In these bearings the resultant of the vertical and horizontal load may not exceed the highest admissible load, so that, where the load is only radial, the bearing is only called upon to take up about two-thirds of its permissible load.

The bearing according to the present invention, however, can take up besides the full radial load an equal axial load. It is assumed that the suddenly occurring axial thrusts cause a purely rolling motion of the balls. This great improvement is effected by the invention, as is shown in Fig. 2, and is the essential feature of the latter.

Fig. 2 shows, that by a suitable arrangement of the surfaces of the flanges $i$ and $i^1$, a sliding of the balls at the points of contact $a$, $a^1$, $b$ and $b^1$ may be prevented, if lines passing through the points of contact, intersect, when produced, at a point $o$. By this means a purely rolling motion of the balls is obtained.

If a spherically turned outer race be used with a double groove separated by a flange $h$ for two rows of balls, as shown in Fig. 3, the following considerable advantages are realized:—

An automatic adjustment of the bearing about the point of intersection of the axis with the centre of the ball bearing, A uniform loading of the two rows of balls in the radial direction and The possibility of the bearing following the movements of the shaft on the latter becoming inclined due to shocks.

In the case of normal bearings such shocks may produce impressions in the running surfaces or may even cause the balls to burst.

What I claim is:—

A ball bearing having inner and outer rings, each with double races for double sets of balls, said rings being arranged concentrically about a horizontal axis, and double sets of balls interposed in said race between the two rings, the inner and the outer rings having curved faces for taking up the radial thrust which faces are of larger curvatures than that of the balls and lateral faces normally out of contact with the balls for taking up the axial thrust and arranged so as to act in opposite directions to each other, the relative positions of the points of contact between the balls and the rings and their lateral faces in cases of combined horizontal and vertical stresses being such that the lines connecting two points of contact between the balls and the inner ring and those connecting the two points of contact between the balls and the outer ring lie on imaginary cones having a common apex at the axis of the bearing whilst in the case of a purely vertical thrust the only points of contact between the balls and the two rings lie in planes perpendicular to the axis of the bearing.

In testimony whereof I have signed my name to this specification.

ADOLF DOWALD.

Witnesses:
WILHELM OSTERBUGE,
AUG. GERLING.